US011003520B2

(12) United States Patent
Rol

(10) Patent No.: US 11,003,520 B2
(45) Date of Patent: May 11, 2021

(54) METHOD OF DETECTING FAILURES

(71) Applicants: Continental Automotive France, Toulouse (FR); Continental Automotive GmbH, Hannover (DE)

(72) Inventor: Baptiste Rol, Toulouse (FR)

(73) Assignees: Continental Automotive France; Continental Automotive GmbH

( * ) Notice: Subject to any disclaimer, the term of this patent is extended or adjusted under 35 U.S.C. 154(b) by 135 days.

(21) Appl. No.: 16/330,816

(22) PCT Filed: Sep. 11, 2017

(86) PCT No.: PCT/FR2017/052403
§ 371 (c)(1),
(2) Date: Mar. 6, 2019

(87) PCT Pub. No.: WO2018/050994
PCT Pub. Date: Mar. 22, 2018

(65) Prior Publication Data
US 2019/0286511 A1    Sep. 19, 2019

(30) Foreign Application Priority Data
Sep. 14, 2016   (FR) ...................... 1658574

(51) Int. Cl.
*G06F 11/07*      (2006.01)
*F02D 41/22*      (2006.01)
(Continued)

(52) U.S. Cl.
CPC ......... *G06F 11/0757* (2013.01); *B60W 50/02* (2013.01); *F02D 41/22* (2013.01);
(Continued)

(58) Field of Classification Search
CPC combination set(s) only.
See application file for complete search history.

(56) References Cited

U.S. PATENT DOCUMENTS

| 5,999,876 A * | 12/1999 | Irons ..................... F02D 41/263 |
| | | 701/115 |
| 6,434,455 B1 * | 8/2002 | Snow .................. G06F 11/2294 |
| | | 701/31.4 |

(Continued)

FOREIGN PATENT DOCUMENTS

EP    1860308 A1    11/2007

OTHER PUBLICATIONS

International Search Report and Written Opinion for International Application No. PCT/FR2017/052403, dated Nov. 20, 2017—9 pages.

(Continued)

*Primary Examiner* — Amine Riad
(74) *Attorney, Agent, or Firm* — RatnerPrestia

(57) ABSTRACT

A method of detecting failures of an engine control computer including at least: a hardware layer, a software layer comprising at least one activation cycle of the load m phase(s) of activation of said load with: actuation of the load, first timeout, deactivation of the load, second timeout. The method of detecting failures includes a measurement time window during which the following are carried out: an initialization of the measurement variables, detection of an actuation of the load, an action of reinitializing the engine control computer if at least one of the following conditions is valid: $\Delta T1 > \Delta T1\_ref$, $\Delta T2 < \Delta T2\_ref$, $\Delta T3 > \Delta T3\_ref$, $\Delta T4 < \Delta T4\_ref$.

9 Claims, 5 Drawing Sheets

(51) Int. Cl.
*F02M 51/06* (2006.01)
*F02D 41/26* (2006.01)
*B60W 50/02* (2012.01)
*F02D 41/20* (2006.01)

(52) U.S. Cl.
CPC ......... *F02D 41/26* (2013.01); *F02M 51/0603* (2013.01); *G06F 11/079* (2013.01); *G06F 11/0739* (2013.01); *G06F 11/0754* (2013.01); *G06F 11/0793* (2013.01); *B60W 50/0205* (2013.01); *F02D 41/2096* (2013.01); *F02D 41/221* (2013.01); *F02D 2041/2027* (2013.01); *F02D 2041/2055* (2013.01); *G06F 11/0796* (2013.01); *G06F 2201/805* (2013.01); *G06F 2201/81* (2013.01)

(56) References Cited

U.S. PATENT DOCUMENTS

| | | | | |
|---|---|---|---|---|
| 7,912,600 | B2* | 3/2011 | Iwagami | F02D 41/28 701/32.8 |
| 9,080,519 | B2* | 7/2015 | Howell | F02D 41/24 |
| 2003/0078744 | A1 | 4/2003 | Hirn et al. | |
| 2008/0004765 | A1 | 1/2008 | Falter et al. | |
| 2009/0088892 | A1* | 4/2009 | Shimizu | G05B 9/03 700/213 |
| 2009/0121724 | A1 | 5/2009 | Perryman et al. | |
| 2010/0292808 | A1* | 11/2010 | Berglund | G06F 1/3203 700/3 |
| 2011/0180031 | A1* | 7/2011 | Hamane | F02N 11/10 123/179.4 |
| 2011/0276253 | A1* | 11/2011 | Kjar | F02D 41/0025 701/103 |
| 2014/0372013 | A1* | 12/2014 | Shimizu | F02N 11/108 701/112 |
| 2017/0203826 | A1* | 7/2017 | Okuda | B63H 21/14 |
| 2018/0091068 | A1* | 3/2018 | Yoshimura | G01R 31/64 |

OTHER PUBLICATIONS

English translation of the Written Opinion for International Application No. PCT/FR2017/052403, dated Nov. 20, 2017, 7 pages.

* cited by examiner

METHOD OF DETECTING FAILURES

CROSS REFERENCE TO RELATED APPLICATIONS

This application is the U.S. National Phase Application of PCT International Application No. PCT/FR2017/052403, filed Sep. 11, 2017, which claims priority to French Patent Application No. 1658574, filed Sep. 14, 2016, the contents of such applications being incorporated by reference herein.

FIELD OF THE INVENTION

The present invention pertains in a general manner to the protection of electronic devices such as for example a computer.

It relates more particularly to a method dedicated to the detection of a failure of a computer on at least one output that may give rise to partial or total destruction of said computer.

The invention is applicable in particular in the automotive field. It can be implemented, for example, in an engine control computer.

BACKGROUND OF THE INVENTION

Nowadays, an automotive vehicle comprises more and more embedded electronics such as for example computers. These computers may be dedicated to the management of the cabin, of braking and also to the management of the engine. An engine computer, also named engine control computer, is adapted to manage functions of the engine such as for example admission, exhaust and/or also injection.

To manage these functions, the engine control computer exhibits a computation and control unit adapted to perform tasks allowing command and control of the engine for example thermal, at least one memory adapted to store for example a computer program, adaptation stages and power stages. Thus, in the case of the management of the injection of a diesel engine, the engine control computer exhibits a power stage adapted to command injectors. Relatively high powers are generated and sometimes failures can occur and give rise to partial or total destruction of the engine control computer.

These failures can be software failures such as for example a loss of information at the level of the adaptation stage causing continuous activation of the injector or activation for a relatively long duration that may lead to destruction of the injector and/or stalling of the thermal engine or indeed in the worst case breakdown of said thermal engine. These failures can also impair the engine control computer. Indeed, the activation for a relatively long duration of one or more power outputs of the engine control computer can cause an overconsumption of said outputs and lead to overheating or indeed destruction either of the power stage or of the engine control computer.

To protect the engine control computer from such failures, it is known to install protection means at the level of the engine control computer to monitor, as a function of a determined strategy, the state of the output stages. These protection means, upon the detection of a failure at the level of the output stage, cause a partial or total resetting to zero of the engine control computer thus avoiding breakdown of the latter.

Sometimes, in very specific and often random configurations, the protection means do not detect sufficiently early the failure at the level of the outputs of the power stage and this may cause the destruction of the engine control computer.

SUMMARY OF THE INVENTION

An aspect of the invention proposes a method intended for the protection from a failure of an engine control computer making it possible to remedy partially or totally the technical lack of the prior art cited.

To this effect, a first aspect of the invention proposes a method of detecting failures of an engine control computer; the engine control computer comprising at least:

a hardware layer with a computation and control unit, a command unit, a power module adapted to command at least one load, a software layer executed at least partially by the computation and control unit and comprising n steps of launching at least one activation cycle of the load, an activation cycle of the load comprising m phase(s) of activation of said load, a phase of activation of the load comprising steps as follows:

actuation of the load with the aid of a first command signal of a first duration, first timeout of a first minimum holding time, deactivation of the load with the aid of a second command signal of a second duration, second timeout of a second minimum holding time, characterized in that the method of detecting failures comprises a measurement time window exhibiting a duration equal to the duration of an activation phase of the load and during which the following steps are carried out:

a) initialization of the measurement variables $\Delta T1$, $\Delta T2$, $\Delta T3$, $\Delta T4$, Threshold_min, Threshold_max and defect, b) detection of an actuation of the load, c) measurement during the load activation phase of:
the first duration of the first command signal,
the second duration of the second command signal,
the first timeout of the first minimum holding time,
of the second timeout of the second minimum holding time,
a minimum amplitude and a maximum amplitude of a fifth command signal, d) recording of values of the measurements performed in step c):
recording of the value of the first duration of the first command signal in the variable $\Delta T1$,
recording of the value of the second duration of the second command signal in the variable $\Delta T3$,
recording of the value of the first timeout of the first minimum holding time in the variable $\Delta T2$,
recording of the value of the second timeout of the second minimum holding time in the variable $\Delta T4$,
recording of the value of the minimum amplitude in the variable Threshold_min, and
recording of the value of the maximum amplitude in the variable Threshold_max.

e) comparison of the values of the variables $\Delta T1$, $\Delta T2$, $\Delta T3$, $\Delta T4$, Threshold_min, Threshold_max stored in step d) with respective reference values $\Delta T1\_ref$, $\Delta T2\_ref$, $\Delta T3\_ref$, $\Delta T4\_ref$, Threshold_min_ref, Threshold_max_ref, f) action of reinitializing the engine control computer if at least one of the following conditions is valid:

$\Delta T1 > \Delta T1\_ref$, $\Delta T2 < \Delta T2\_ref$,

ΔT3>ΔT3_ref,

ΔT4<ΔT4_ref.

By virtue of such a method it is now possible to detect a failure of an engine control computer at the level of an output commanding the load before a possible failure and destruction of the latter.

For the sake of discriminating the importance of the type of anomaly, it is advantageously proposed for example that in step f) a complementary step of action of reinitializing the software layer and the hardware layer of the engine control computer in the case where the defect variable=0 and that at least one of the conditions hereinbelow is valid:

ΔT1>ΔT1_ref,

ΔT2<ΔT2_ref,

ΔT4<ΔT4_ref.

Thus, it is possible to detect cases of anomalies that could cause destruction of the engine control computer and to protect it by a complete resetting to zero, that is to say of the software part and also of the component part.

In order to detect other cases which are potentially destructive but to a lesser extent, it is also for example proposed that in step f) a complementary step of action of reinitializing the command unit of the engine control computer concerning in the case where the defect variable=0 and that at least one of the conditions hereinbelow is valid:

ΔT1>ΔT1_ref,

ΔT3>ΔT3_ref.

Advantageously, by virtue of this step it is possible to reinitialize that a software part of the engine control computer.

In order to improve the discrimination it is also proposed as a variant that in step f) a complementary step of action of reinitializing the software layer of the engine control computer in the case where the defect variable=1 and that at least one of the conditions hereinbelow is valid:

ΔT1>ΔT1_ref,

ΔT3>ΔT3_ref.

When a doubt persists regarding the seriousness of the failure then there is, for example, proposed in step f) a complementary step of action of reinitializing the software layer and the hardware layer of the engine control computer in the case where the defect variable >1.

To protect the computer when it is in operation, provision is for example made for the steps carried out in a measurement time window to be repeated a number e of times; the number e corresponding to the number n of steps of launching at least one activation cycle of the load.

In a quest to optimize the memory space occupied in the engine control computer, it is as a variant proposed that the reference values ΔT1_ref, ΔT3_ref are identical.

In the case of a thermal engine, it is for example proposed that the load be an injector.

For example, the method can control an injector of a diesel engine.

BRIEF DESCRIPTION OF THE DRAWINGS

Other features and advantages of aspects of the invention will become more apparent upon reading the following description. This description is purely illustrative and should be read with reference to the appended drawings, in which.

DETAILED DESCRIPTION OF THE PREFERRED EMBODIMENTS

Figure 1:
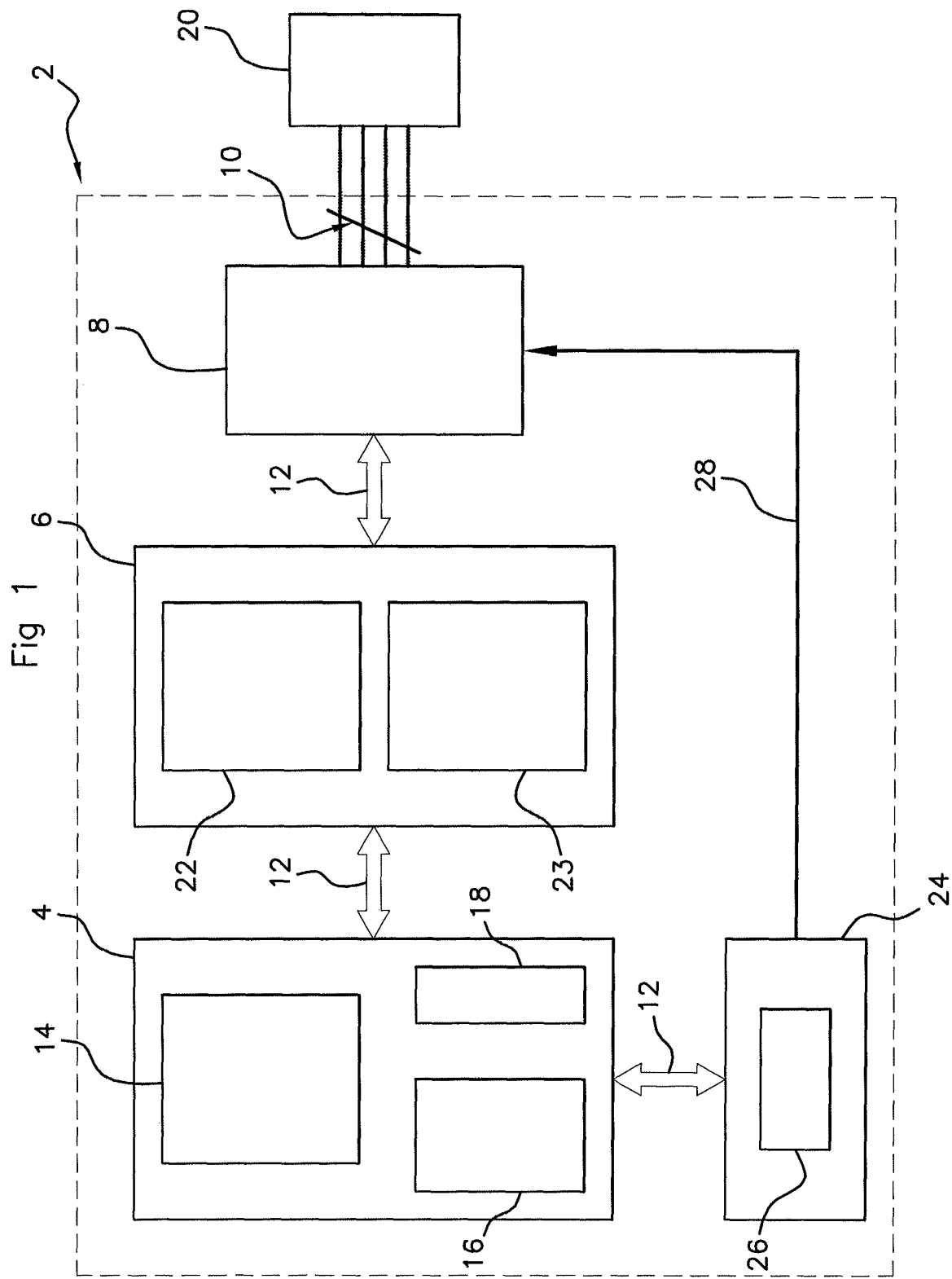
FIG. 1 is a basic diagram of an architecture of an engine control computer.

FIG. 1 represents a basic diagram of an architecture of a computer 2. The computer 2 of FIG. 1 is for example an engine control computer installed on an automotive vehicle exhibiting a diesel engine plant. Thus, the engine control computer 2 comprises inter alia, a computation and control unit 4, a command unit 6, a power module 8 coupled to power outputs 10 and a communication bus 12.

The computation and control unit 4 comprises among other things a master microcontroller 14, at least one memory 16 adapted to store programs and input/output stages 18. The various elements of the computation and control unit 4 are coupled together by links that are not represented in the figures so as not to overload the drawings. The master microcontroller 14 is for example a 32-bit multi-core microcontroller clocked at a frequency of 128 MHz.

The communication bus 12 is for example a communication bus of SPI type for "Serial Peripheral Interface" in English, adapted to receive and deliver communication signals and control signals to the modules of the engine control computer 2. The input/output stages 18 are for example analog-digital converters adapted to receive and deliver command signals to the modules of the engine control computer 2.

Of course, the person skilled in the art will readily understand on reading the above paragraphs and the drawings that only the units that are useful to the understanding of an aspect of the invention have been described. Furthermore, the types of components used and presented succinctly in the above paragraphs are given purely by way of illustration.

The computation and control unit 4 comprises inter alia, a component layer described above which may also be named by the person skilled in the art "hardware or HW" layer and a software layer or also named "software or SW" layer. The software layer is very complex and comprises various software sections making it possible to control and/or command an internal combustion engine. In the subsequent description, the internal combustion engine will sometimes be named thermal engine. There are so-called application software sections making it possible to command diverse parameters of the thermal engine and at least one software section adapted to drive and control at least one injector 20 of the thermal engine.

This software section is adapted to drive and control the injectors 20 of the thermal engine and is often called by the person skilled in the art "basic software". It makes it possible as a function of a determined strategy to control the injection of the thermal engine via the injectors 20. Of course, the person skilled in the art will understand that the software layer is adapted to deliver, with the aid of adapted electronic components, command signals to the various modules of the engine control computer 2, that is to say to the command unit 6 and to the power module 8. Thus, there are delivered requests, termed injection requests, as a function of real-time events, of interruptions, of internal clocks, also named by the person skilled in the art "internal timer", of computations performed by the master microcontroller 14 and also in response to signals originating from the thermal engine. The signals used to command the injectors 20 will be presented further on in the description.

The command unit 6 comprises for example a first slave microcontroller 22 and at least one conversion module 23 adapted to convert electrical signals originating from the computation unit 4. The first slave microcontroller 22 is adapted to execute tasks requested by the master microcontroller 14 and to analyze/process signals originating from the power module 8. Furthermore, the first slave microcontroller 22 comprises a software layer adapted to perform the tracking of the position of the injectors 20. Thus, by virtue of this software layer, it is possible to know the state of the real-time injectors 20 accurately. Accordingly, the command unit 6 receives on one of these inputs a signal named V_inj_return originating from power module 8, signal representative of the position of the injectors 20. In a variant embodiment, the first slave microcontroller 22 can be a programmable component of ASIC type, abbreviation of the English "Application Specific Integrated Circuit". The power module 8 will not be further described in the description since its architecture is well known to the person skilled in the art.

In order to protect the engine control computer 2 and also the injectors 20 from possible failures a monitoring module 24 is integrated into the engine control computer 2. This monitoring module 24 comprises for example a second slave microcontroller 26. The monitoring module 24 is coupled to the computation and control unit 4 with the aid of the communication bus 12 and to the power module 8 with the aid of a control bus 28. In the example represented in FIG. 1, the control bus 28 comprises a single connection. As a variant and as a function of the type of engine control computer 2 and also of the engine to be controlled, the control bus 28 can comprise a number n of connections. This type of control bus 28 may be for example an asynchronous serial communication bus known to the person skilled in the art.

It is possible for failures to occur during the command and the control of the injection of the internal combustion engine. These failures may be physical, that is to say for example a failure of an injector 20; in this case the engine control computer 2 detects the failed injector 20 and informs the driver thereof. On account of the complexity of the architecture of the engine control computer 2 and of the real-time command of the injectors 20, it is possible that software failures may occur such as for example requests made by the command unit 6 with a command time of the injectors 20 that is too long or is offset with respect to the engine's combustion cycle. Thus, when a failure of this type occurs then a breakdown of the computer is possible.

The injectors 20 are for example piezoelectric injectors. In the subsequent description, the injectors 20 will be considered in a first approach to be capacitors. This simplification of the behavior of the injectors 20 will allow a better understanding of an aspect of the invention. It should be noted that the person skilled in the art often uses this type of approach to illustrate the operation of a piezoelectric injector.

Figure 2:
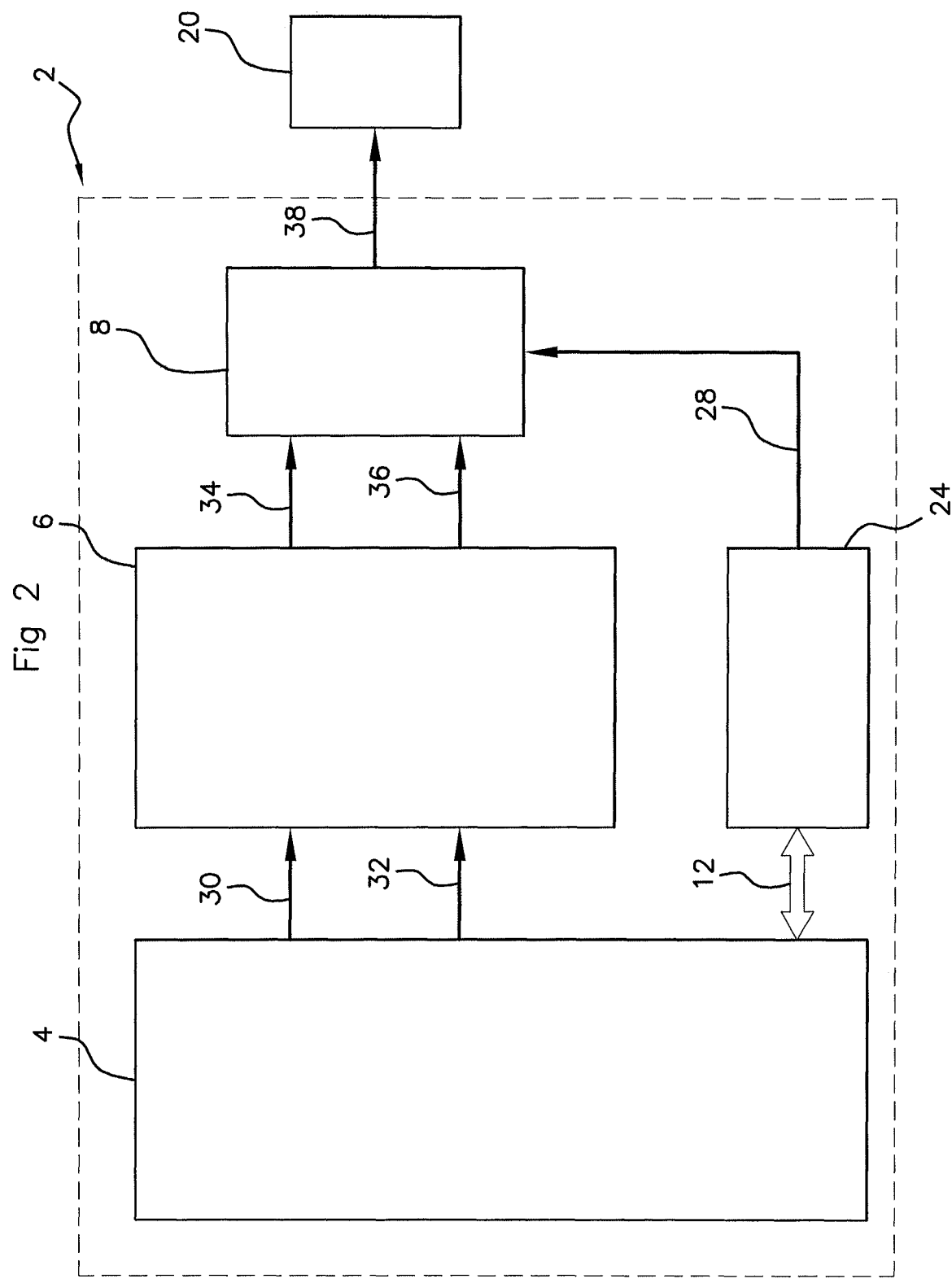
FIG. 2 is a simplified view of the engine control computer represented in FIG. 1.

FIG. 2 is a simplified view of the engine control computer 2 represented in FIG. 1. Depicted therein are the computation and control unit 4, the command unit 6, the power module 8, the injectors 20, the monitoring module 24 and the control bus 28. Only the signals which are useful for understanding the method of an aspect of the invention are represented in place of the communication bus 12.

Thus, a first link 30 and a second link 32 couple the computation and control unit 4 to the command unit 6. The first link 30 and the second link 32 deliver respectively a first command signal 30_1 and a second command signal 32_1. A third link 34 and a fourth link 36 couple the command unit 6 to the power module 8. The third link 34 and the fourth link 36 deliver respectively a third command signal 34_1 and a fourth command signal 36_1. These signals will be presented subsequently in the text of the description. In a preferred embodiment, the first link 30, the second link 32, the third link 34 and the fourth link 36 are links with a unidirectional transfer of data. In a variant embodiment, at least one of these four links is bidirectional thus decreasing the complexity of the internal wiring of the engine control computer 2.

A fifth link 38 couples the power module 8 to an injector 20. Of course, the person skilled in the art will understand that the number of fifth links 38 is proportional to the number of injectors 20 to be commanded. Thus, for better readability of the diagram of FIG. 2 a single fifth link 38 is represented. This fifth link 38 is adapted to deliver a fifth command signal 38_1 to an injector 20 making it possible to command it.

Figure 3:
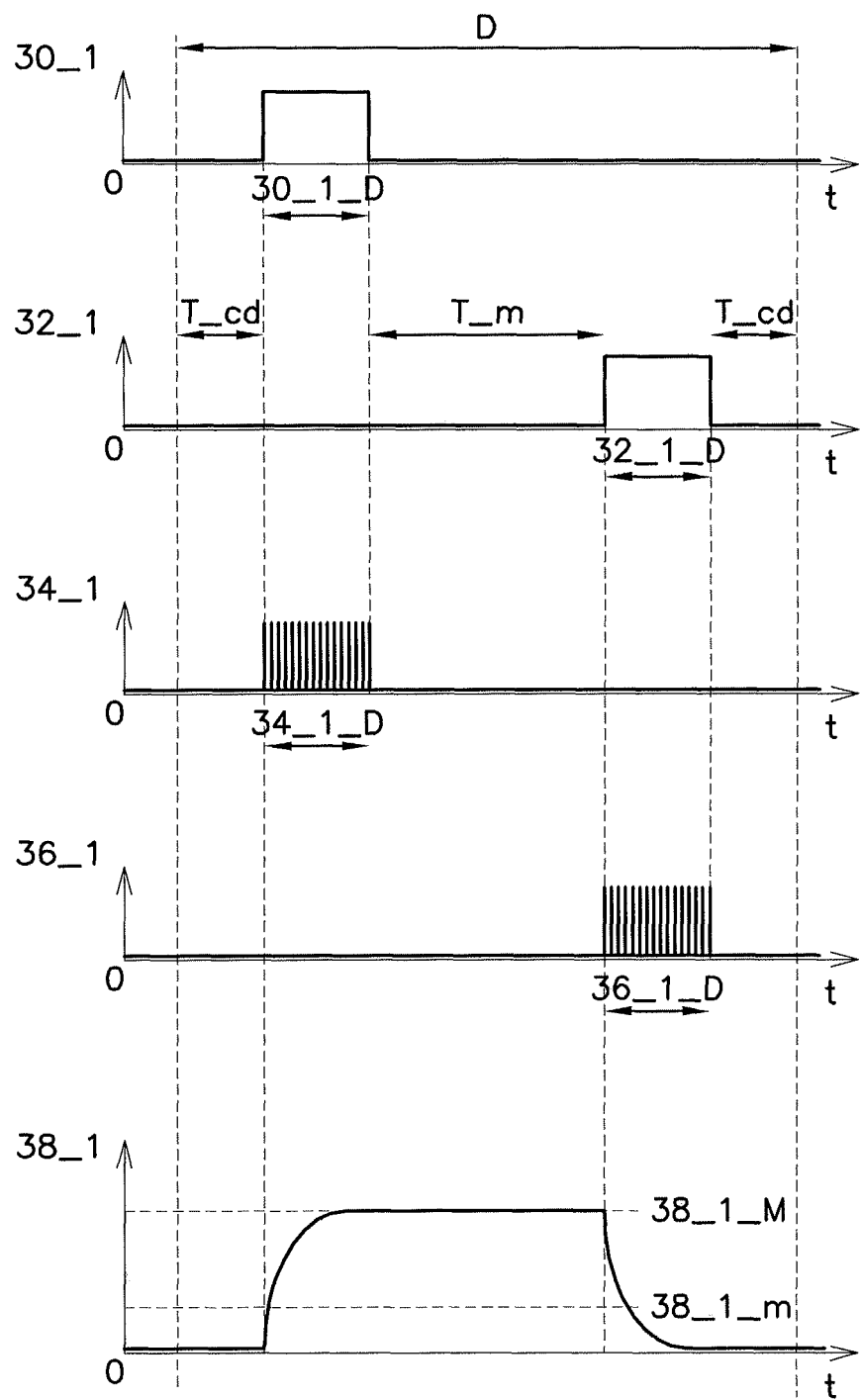
FIG. 3 is a graph illustrating states of the main signals traveling through the engine control computer of the two previous figures.

FIG. 3 represents the first command signal 30_1, the second signal 32_1, the third command signal 34_1, the fourth command signal 36_1 and the fifth command signal 38_1 during an injection phase of an injection cycle. In order to facilitate its reading, a single injection phase has been represented in FIG. 3. However, it is known to the person skilled in the art that an injection cycle comprises a determined number of injection phases. In the example of FIG. 3, an injection phase exhibits a duration D of a value of 600 μs (1 μs=$10^{-6}$ s); this value is purely illustrative and nonlimiting.

The first command signal 30_1 delivered by the computation and control unit 4 is representative of an injection instruction, or as mentioned above in the description, if we consider an injector 20 to be a capacitor then, the first command signal 30_1 is representative of a charging instruction in respect of the capacitor. The duration of activation depends on the type of injector 20, in the example of FIG. 3 we consider that the first command signal 30_1 exhibits a first duration 30_1_D of a value of 200 μs (1 μs=$10^{-6}$ s). This first duration 30_1_D is symbolized by the setting to "1" or high state, of the first command signal 30_1. During the remainder of the injection phase, the first command signal 30_1 is in the low state or "0".

The second command signal 32_1 delivered by the computation and control unit 4 is representative of an injection stoppage instruction, or as mentioned above in the description if we consider an injector 20 to be a capacitor then, the second command signal 32_1 is representative of a discharging instruction in respect of the capacitor. The duration for deactivating an injector 20 also depends on the type of injector 20. In the example of FIG. 3, it is considered that the second command signal 32_1 exhibits a second duration 32_1_D of a value of 200 μs (1 μs=$10^{-6}$ s). This second duration 32_1_D is symbolized by the setting to "1", or high state, of the second command signal 32_1. During the remainder of the injection phase, the second command signal 32_1 is in the low state or at "0".

The third command signal 34 exhibits a third duration 34_1_D of a value of 200 µs. In a preferred embodiment the value of the third duration 34_1_D is identical to the value of the first duration 30_1_D.

The fourth command signal 36 exhibits a fourth duration 36_1_D of a value of 200 µs. In a preferred embodiment, the value of the fourth duration 36_1_D is identical to the value of the second duration 34_1_D.

The third command signal 34 and the fourth command signal 36 are, for example, signals of PWM type, for "Pulse Width Modulation" in English. Thus, it is possible by virtue of the third command signal 34 and of the fourth command signal 36 to command one or more injector(s) 20. A PWM signal is mainly characterized by a frequency and above all by a duty cycle value. As a function of the injector 20 to be commanded, the frequency as well as the duty cycle of the third command signal 34_1 and of the fourth command signal 36_1 can be modified. During the remainder of the injection phase, the third command signal 34_1 and the fourth command signal 36_1 are in the low state or at "0". The numerical values cited hereinabove are given purely by way of illustration and in no case limit the scope of an aspect of the invention.

As illustrated in FIG. 3, the fifth command signal 38_1 exhibits over an injection phase of a duration D a general form of charging and discharging of a capacitor in response to the third command signal 34_1 and to the fourth command signal 36_1. The fifth command signal 38_1 exhibits a minimum amplitude 38_1_m and a maximum amplitude 38_1_M. The value of the minimum amplitude 38_1_m is for example 27V. This minimum value corresponds to the threshold value from which the injector 20 is no longer considered to be active. The value of the maximum amplitude 38_1_M is for example 140V. The value of the maximum amplitude 38_1_M is given by way of example and preferably lies between 130V and 180V. The value of the maximum amplitude 38_1_M corresponds to the value from which the injector 20 is activated, that is to say that fuel is sprayed into a corresponding combustion chamber of the thermal engine. The values of the minimum amplitude 38_1_m and of the maximum amplitude 38_1_M are controlled by the third duration 34_1_D and the fourth duration 36_1_D respectively of the third command signal 34 and of the fourth command signal 36.

To avoid any failure, it is known by the person skilled in the art to leave a minimum holding time T_m between a high state of the third command signal 34_1 and a high state of the fourth command signal 38_1. This minimum holding time T_m may sometimes also be called first timeout in the description. For example, the minimum holding time T_m exhibits a minimum value of 10 µs (1 µs=$10^{-6}$ s). In the case where the minimum holding time T_m is less than 10 µs (1 µs=$10^{-6}$ s) a case of failure on an injector 20 is possible that could cause either the breakdown of the latter or the destruction of the engine control computer 2.

The method which will be described hereinbelow of an aspect of the present invention makes it possible to detect a command failure of at least one injector 20 so as to protect both said injector 20 and the engine control computer 2 at one and the same time.

Figure 4:
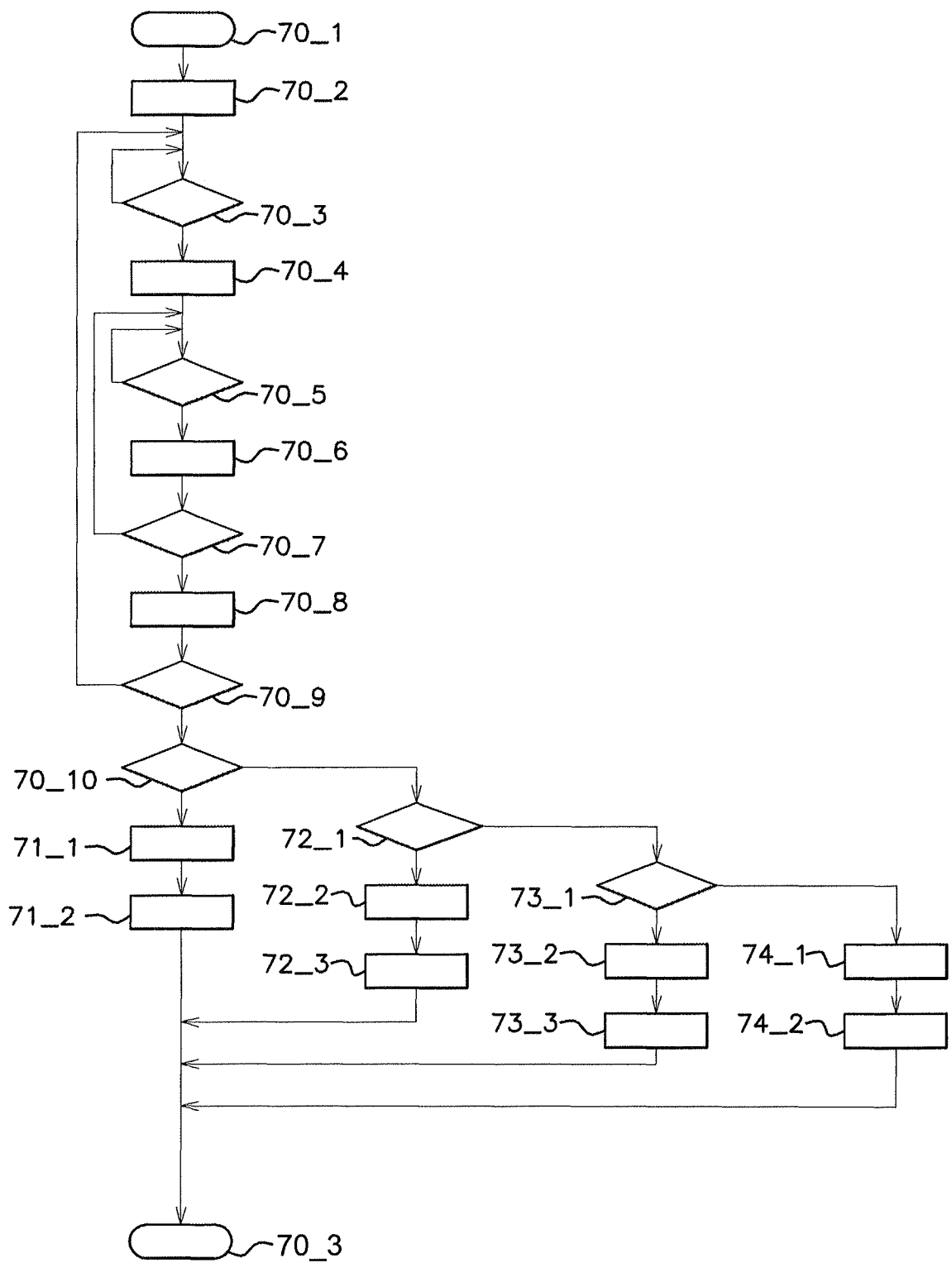
FIG. 4 is a failure detection algorigram according to the method of an aspect of the present invention.

FIG. 4 represents said failure detection method in the form of an algorigram. This failure detection method can be implemented either in the computation and control unit 4 or in the command unit 6 or in the monitoring module 24.

Figure 5:
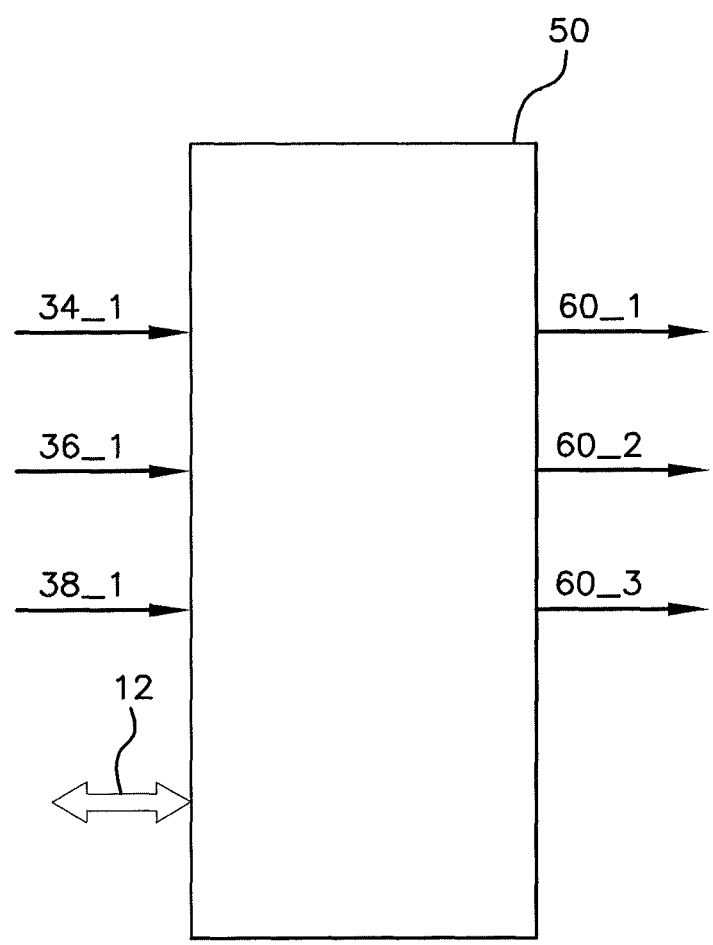
FIG. 5 is an illustrative basic diagram of the software layer of the method of FIG. 4.

FIG. 5 symbolically illustrates the software layer of the method of an aspect of the invention of FIG. 4. Of course, the software layer of the method of an aspect of the invention illustrated in FIG. 4 can be added to software layers already present in the command unit 6. As a variant, in a quest to improve the performance and reliability of the method of an aspect of the invention, the method can be implemented in a programmable component of ASIC type. Said program component of ASIC type being able to be either the command unit 6 or the control unit 4. It can also be envisaged that the method of an aspect of the invention be implemented in a dedicated component. This dedicated component can be either added to the internal structure of the engine control computer 2 (in its casing) or in an external manner, such as for example with a remotely sited module coupled to the engine control computer 2 via a communication bus.

The method of an aspect of the invention consists in adding a measurement window 50. This measurement window 50 allows the measurement of the state of the signals delivered by the command unit 6 and by the power module 8. Thus as represented in FIG. 5, the signals monitored by the method of an aspect of the present invention are the third command signal 34_1, the fourth command signal 36_1 and the fifth command signal 38_1. Of course to facilitate communication with the computation and control unit 4, the method of an aspect of the invention processes information originating from the communication bus 12. Furthermore, the method of an aspect of the invention (and its software layer) is also adapted to generate information via said communication bus 12.

In order to protect the engine control computer 2, the failure detection method presented here is adapted to emit a sixth command signal 60_1, a seventh command signal 60_2 and an eighth command signal 60_3. These three command signals are in an exemplary embodiment integrated into the communication bus 12 and allow communication with the computation and control unit 4 for failure monitoring.

Steps of the failure detection method according to an aspect of the present invention and such as is represented in FIG. 4 will be presented in the subsequent description. In order to simplify the explanation of the method and as explained above in the description an injector 20 will be considered to be a capacitor and therefore we shall speak here of charging or discharging in place of activation or deactivation of the injector 20. Furthermore, so as to simplify the description of the method, the latter will be presented in the case of a single injection phase such as represented in FIG. 3.

The method of an aspect of the present invention begins with a first step 70_1 of launching. This first step 70_1 may be for example activated when inserting the contact key into the ignition of the automotive vehicle.

After the first step 70_1 of launching, a second step 70_2 of initialization is carried out. During this second step 70_2 of initialization several variables are reset to zero. In the example described here, eight variables are used and are called FLAG, ΔT1, ΔT2, ΔT3, ΔT4, Threshold_min, Threshold_max and defect. Of course, the number of variables is dependent on the type of engine control computer 2 and/or on the type of engine and its injection. Advantageously, the number of variable can be modified.

A third step 70_3 of monitoring of instruction of charging or discharging is thereafter carried out. When a charging or discharging instruction is detected then a fourth step 70_4 of measurement activation is launched. For the record, we shall adopt the standpoint here of the case where an injection phase comprises a charging instruction and a discharging instruction (in respect of the injector 20). This measurement activation fourth step 70_4 consists in measuring during the injection phase:

the first duration 30_1_D of the first command signal 30_1,
the second duration 32_1_D of the second command signal 32_1,
the minimum holding time T_m,
a duration T_cd between charging instruction and a discharging instruction.

The minimum amplitude 38_1_m and the maximum amplitude 38_1_M of the fifth command signal 38_1 are also measured during the measurement activation fourth step 70_4.

The fourth step 70_4 is active during a complete injection phase, that is to say as long as the injection phase has not terminated, this being represented by a fifth step 70_5 of waiting for the end of the injection phase.

At the end of the injection phase corresponding to step 70_5 the method comprises a sixth step 70_6 of recording the values of the variables as follows:

recording of the value of the first duration 30_1_D of the first command signal 30_1 in the variable $\Delta T1$,
recording of the value of the second duration 32_1_D of the second command signal 32_1 in the variable $\Delta T3$,
recording of the value of the minimum holding time T_m in the variable $\Delta T2$,
recording of the value of the duration T_cd corresponding to the time between a charging instruction and a discharging instruction in the variable $\Delta T4$,
recording of the value of the minimum amplitude 38_1_m in the variable Threshold_min, and
recording of the value of the maximum amplitude 38_1_M in the variable Threshold_max.

As mentioned above, an injection cycle can comprise several injection phases. Thus the method of an aspect of the invention comprises a seventh step 70_7 of detecting the end of an injection cycle.

In the case of an injection cycle with for example five injection phases, the method of an aspect of the invention performs five measurements and five recordings of the variables presented in the previous step. Of course, the person skilled in the art will readily understand that in this case the data will be stored independently in memories provided for this purpose. As a variant, the method can comprise at the end of an injection cycle, a step which consists of a mathematical operation for averaging the five values of each variable (which is not represented on the algorigram).

An eighth step 70_8 of analyzing the parameters is performed thereafter. This eighth step 70_8 consists of a comparison of the values of the variables $\Delta T1$, $\Delta T2$, $\Delta T3$, $\Delta T4$, Threshold_min and Threshold_max with reference values recorded beforehand for example in a flash memory of the engine control computer 2. The reference values are for example recorded during factory programming of the engine control computer 2 as a function of the type of injection to be controlled. These values are named: $\Delta T1\_ref$, $\Delta T2\_ref$, $\Delta T3\_ref$, $\Delta T4\_ref$, Threshold_min_ref, Threshold_max_ref The values of the variables $\Delta T1$, $\Delta T2$, $\Delta T3$, $\Delta T4$, Threshold_min and Threshold_max are then compared with the values $\Delta T1\_ref$, $\Delta T2\_ref$, $\Delta T3\_ref$, $\Delta T4\_ref$, Threshold_min_ref, Threshold_max_ref. As a function of the results of each comparison and of pre-established conditions which will be presented in the subsequent description, the method of an aspect of the invention will carry out various actions. The method makes provision that if no case of failure is detected then the defect variable remains at "0" and in the case where at least one of the conditions is not complied with then the defect variable is set to "1".

Thereafter, a ninth step 70_9 of testing the defect variable is carried out. In the case where the defect variable is "0" then this implies, according to the method of an aspect of the invention, that no failure has been detected during an injection cycle. In this case, the failure detection method reverts back to the third step 70_3 and the previously described steps are executed again.

In the case where the defect variable is "1" then this implies that a potential failure was detected during the previous injection cycle and the step hereinbelow is carried out.

Advantageously, when a possible failure is detected, it is important to know whether this failure is risky for the engine control computer 2 and also for the injector 20. In an original manner the method of an aspect of the invention makes provision, as a function of the results of the comparisons performed in the eighth step 70_8, for cases which are considered to be destructive for the engine control computer 2 and for cases which are considered less risky for the engine control computer 2 but which, according to the method of an aspect of the invention, require an action on at least one module of the engine control computer 2. The table 1 hereinbelow mentions said cases.

TABLE 1

| | | | | | | |
|---|---|---|---|---|---|---|
| | | | possible cases of failure. | | | |
| Case of malfunctioning | $\Delta T1$ CMD_CHRG | T_OFF between charging and discharging | $\Delta T3$ CMD_DISC | T_OFF between two injections | Description of phenomenon | |
| 1 | OK | NOK $\Delta T2 < \Delta T2$ min | OK | OK or NOK | *Destruction of the injection stage *Vehicle stalling/possible non-restarting | |
| 2 | OK | OK or NOK | OK | NOK $\Delta T4 < \Delta T4$ min | *Destruction of the injection stage following the vehicle revs *Vehicle stalling/possible non-restarting | |

TABLE 1-continued possible cases of failure.

| Case of malfunctioning | ΔT1 CMD_CHRG | T_OFF between charging and discharging | ΔT3 CMD_DISC | T_OFF between two injections | Description of phenomenon |
|---|---|---|---|---|---|
| 3 | NOK ΔT2 > 220 µs or continuously | OK or NOK | OK | OK or NOK | *Destruction of the injection stage *Vehicle stalling/possible non-restarting |
| 4 | NOK ΔT2 > 220 µs or continuously | OK or NOK | NOK Inactive no discharge | OK or NOK | *Non-destructive case for the ECU *Vehicle stalling *Possible restarting |
| 5 | NOK ΔT2 > 220 µs or continuously | OK or NOK | NOK Active continuously | OK or NOK | *Potential destruction of the injection stage *Vehicle stalling/possible non-restarting or restarting according to the control mode |
| 6 | NOK Inactive no discharge | OK or NOK | NOK continuously | OK or NOK | *Non-destructive case for the ECU *Vehicle stalling *Possible restarting |
| 7 | OK | OK or NOK | NOK ΔT3 > 220 µs or continuously | OK or NOK | *Nondestructive case for the ECU *Vehicle stalling *Possible restarting |
| 8 | NOK problem <a>> threshold max | OK or NOK | OK | OK or NOK | *Potential destruction of the injection stage *Vehicle stalling/possible non-restarting or restarting according to the control mode |

Eight cases are cataloged as being of risk to the engine control computer 2.

Out of these eight cases, case No. 1, case No. 2 and case No. 3 are considered by the method of an aspect of the invention to be destructive for the engine control computer 2.

Case No. 4, case No. 6 and case No. 7 are for their part considered by the method of an aspect of the invention to be non-destructive for the engine control computer 2 but, however, to require an action on at least one module of said engine control computer 2.

Finally, case No. 5 and case No. 8 are for their part considered to be potentially destructive for the engine control computer 2 and therefore to require an action on at least one module of the engine control computer 2.

To determine the actual case present, the method comprises a tenth step 70_10 of identifying the type of failure. Thus, three possibilities are envisaged:
failure of "destruction" type,
failure of "potential destruction" type requiring an action on the engine control computer 2, and
failure of "non-destructive" type but requiring an action on the engine control computer 2.

Cases 1 to 3 correspond as per the method of an aspect of the invention to cases of destruction of the engine control computer 2. More precisely, these three cases correspond to possible destruction of the power module 8 if no action is carried out.

In order to avoid this destruction, the method of an aspect of the invention advantageously proposes an eleventh step 71_1 of complete resetting to zero of the engine control computer 2, that is to say a resetting to zero of the software layer and of the hardware layer. Thus, the engine control computer 2 is relaunched and a new injection cycle can begin. This eleventh step 71_1 requires only a few milliseconds and is imperceptible to the driver. By virtue of the method of an aspect of the invention, no engine timing is carried out during this step of the method of an aspect of the invention.

As a variant, the method provides for a twelfth step 71_2 of additional resetting to zero of the FLAG variant.

In another variant, not represented on the algorigram, provision may also be made to display an alert item on a dashboard of the vehicle after a determined number of eleventh steps 71_1.

In the case where the failure detected by the method is not that of the destructive cases, that is to say of cases 1 to 3, then a thirteenth step 72_1 of failure identification is carried out.

This thirteenth step 72_1 makes it possible to identify whether we are in the presence of a failure of "potential destruction" type, that is to say with reference to table 1, cases No. 5 and No. 8, or of a failure of the "non-destructive" type, that is to say with reference to table 1, cases No. 4, No. 6 and No. 7. Accordingly, the thirteenth step 72_1 tests the FLAG variable.

In the case where a failure of "non-destructive" type is identified, thus corresponding to the case where the FLAG variable is at "0" then a fourteenth step 72_2 of hardware resetting to zero is carried out.

This fourteenth step 72_2 consists of a resetting to zero of the command unit 6.

Once the hardware reset to zero has been performed the method provides for a fifteenth step 72_3 which increments the FLAG variable by "1". Once this fifteenth step 72_3 has been performed the method makes provision to return to the third step 70_3.

In the case where the FLAG variable exhibits a different value from "0" a sixteenth step 73_1 of testing the FLAG variable is carried out.

The sixteenth step 73_1 of the method consists in ascertaining whether the FLAG variable exhibits a value equal to "1".

In the case where the FLAG variable is equal to "1" then, a seventeenth step 73_2 is performed and consists of a software reset to zero of the command unit 6.

Thereafter the method provides for an eighteenth step 73_3 in which the FLAG variable is incremented by "1".

In the case where the FLAG variable is greater than "1" then a nineteenth step 74_1 consisting of a complete resetting to zero of the engine control computer 2 is performed. Thus, the hardware part and the software part of the engine control computer 2 is performed.

The FLAG variable is reset to zero thereafter in a twentieth step 74_2.

As illustrated in the algorigram of FIG. 4 after steps 73_3 and 74_2 the method is relaunched at the third step 70_3.

By virtue of the method of an aspect of the invention, it is now possible to detect cases of failure by monitoring by virtue of a time window for measuring the injectors command signals and to detect possible failure cases. By virtue of an aspect of the invention, the risk of destruction of the engine control computer is decreased thus improving the vehicle driving quality and also improving the safety of said vehicle. Indeed, when an engine control computer is destroyed the engine cuts out and the vehicle stops, which may, in certain cases, be dangerous. Advantageously, such a method will be easily integrated and integratable into already existing software layers of an engine control computer. Moreover, such a method will occupy only very little additional memory space, thus giving rise to a very low cost overhead.

Of course, aspects of the present invention are not limited to the preferred embodiment described hereinabove and illustrated in the drawing and to the variant embodiments mentioned but extends to all variants within the scope of the person skilled in the art.

The invention claimed is:

1. A method of detecting failures of an engine control computer; the engine control computer comprising at least:
a hardware layer with a computation and control unit, a command unit, a power module adapted to command at least one load,
a software layer executed at least partially by the computation and control unit and comprising n steps of launching at least one activation cycle of the load, an activation cycle of the load comprising a natural number m phase(s) of activation of said load, a phase of activation of the load comprising:
actuation of the load with aid of a first command signal exhibiting a first duration,
first timeout of a first minimum holding time between an end of the first command signal and a start of a second command signal,
deactivation of the load with aid of the second command signal exhibiting a second duration,
second timeout of a second minimum holding time between an end of the second command signal and a start of a first command signal of a subsequent phase of activation of the load,
wherein the method of detecting failures comprises a measurement time window exhibiting a duration equal to the duration of an activation phase of the load and during which following steps are carried out:
a) initializing measurement variable $\Delta T1$, measurement variable $\Delta T2$, measurement variable $\Delta T3$, measurement variable $\Delta T4$, measurement variable Threshold_min, measurement variable Threshold_max, and measurement variable defect, wherein:
the measurement variable $\Delta T1$ stores a value of the first duration of the first command signal;
the measurement variable $\Delta T2$ stores a value of the first timeout of the first minimum holding time;
the measurement variable $\Delta T3$ stores a value of the second duration of the second command signal;
the measurement variable $\Delta T4$ stores a value of the second timeout of the second minimum holding time;
the measurement variable Threshold_min stores a value of a minimum amplitude of a fifth command signal; and
the measurement variable Threshold_max stores a value of a maximum amplitude of a fifth command signal,
b) detecting an actuation of the load,
c) measuring during the load activation phase:
the first duration of the first command signal,
the second duration of the second command signal,
the first timeout of the first minimum holding time,
of the second timeout of the second minimum holding time,
the minimum amplitude and the maximum amplitude of the fifth command signal,
d) recording values of the measurements performed in step c);
e) comparing the values of the measurement variables $\Delta T1$, $\Delta T2$, $\Delta T3$, $\Delta T4$, Threshold_min, Threshold_max stored in step d) as follows:
comparing the value of the measurement variable $\Delta T1$ stored in step d) with a reference value $\Delta T1$ ref, the reference value $\Delta T1$ ref being a prerecorded reference value for the first duration of the first command signal;
comparing the value of the measurement variable $\Delta T2$ stored in step d) with a reference value $\Delta T2$ ref, the reference value $\Delta T2$ ref being a prerecorded reference value for the first timeout of the first minimum holding time;
comparing the value of the measurement variable $\Delta T3$ stored in step d) with a reference value $\Delta T3$ ref, the reference value $\Delta T3$ ref being a prerecorded reference value for the second duration of the second command signal;
comparing the value of the measurement variable $\Delta T4$ stored in step d) with a reference value $\Delta T4$ ref, the reference value $\Delta T4$ ref being a prerecorded reference value for the second timeout of the second minimum holding time;
comparing the value of the measurement variable Threshold_min stored in step d) with a reference value Threshold_min_ref, the reference value Threshold_min_ref being a prerecorded reference value for the minimum amplitude of a fifth command signal; and
comparing the value of the measurement variable Threshold_max stored in step d) with a reference value Threshold_max_ref, the reference value Threshold_max_ref is a prerecorded reference value for the maximum amplitude of a fifth command signal,
f) reinitializing the engine control computer if at least one of the following conditions is valid:
$\Delta T1$ is greater than $\Delta T1\_ref$,
$\Delta T2$ is less than $\Delta T2\_ref$,
$\Delta T3$ is greater than $\Delta T3\_ref$,
$\Delta T4$ is less than $\Delta T4\_ref$.

2. The method of detecting failures of a control computer as claimed in claim 1, furthermore comprising in step f):
reinitializing the software layer and the hardware layer of the engine control computer in a case where the measurement variable defect is equal to 0 and at least one of following conditions is valid:
$\Delta T1$ is greater than $\Delta T1\_ref$,
$\Delta T2$ is less than $\Delta T2\_ref$,
$\Delta T4$ is less than $\Delta T4\_ref$.

3. The method of detecting failures of a control computer as claimed in claim 1, furthermore comprising in step f):
reinitializing the command unit concerning in a case where the measurement variable defect is equal to 0 and at least one of following conditions is valid:
$\Delta T1$ is greater than $\Delta T1\_ref$,
$\Delta T3$ is greater than $\Delta T3\_ref$.

4. The method of detecting failures of a control computer as claimed in claim 1, furthermore comprising in step f):
reinitializing the software layer of the engine control computer in a case where the measurement variable defect is equal to 1 and at least one of following conditions is valid:
$\Delta T1$ is greater than $\Delta T1\_ref$,
$\Delta T3$ is greater than $\Delta T3\_ref$.

5. The method of detecting failures of a control computer as claimed in claim 1, furthermore comprising in step f):
reinitializing the software layer and the hardware layer of the engine control computer in a case where the measurement variable defect is greater than 1.

6. The method of detecting failures of a control computer as claimed in claim 1, wherein the steps carried out in the measurement time window are repeated a number of times equal to a number of steps of launching at least one activation cycle of the load.

7. The method of detecting failures of a control computer as claimed in claim 1, wherein the respective reference values $\Delta T1\_ref$, $\Delta T3\_ref$ are identical.

8. The method of detecting failures of a control computer as claimed in claim 1, wherein the load is an injector.

9. The method of detecting failures of a control computer as claimed in claim 8, wherein the injector is an injector for a diesel engine.

* * * * *